United States Patent
Stone et al.

(10) Patent No.: US 6,442,937 B1
(45) Date of Patent: Sep. 3, 2002

(54) SOLAR RECEIVER ADAPTIVE TRACKING CONTROL

(75) Inventors: Kenneth W. Stone, Huntington Beach; Gerardo Rodriguez, San Dimas, both of CA (US)

(73) Assignee: The Boeing Company, Chicago, IL (US)

( * ) Notice: Subject to any disclaimer, the term of this patent is extended or adjusted under 35 U.S.C. 154(b) by 0 days.

(21) Appl. No.: 09/934,231

(22) Filed: Aug. 21, 2001

(51) Int. Cl.[7] .................................................. F03E 6/00
(52) U.S. Cl. .............................. 60/641.11; 60/641.15; 126/574; 126/578; 126/597; 126/601
(58) Field of Search ..................... 60/641.8, 641.11; 126/572, 573, 574, 578, 593, 595, 597, 601

(56) References Cited

U.S. PATENT DOCUMENTS

| | | | |
|---|---|---|---|
| 3,994,279 A | * 11/1976 | Barak | 126/271 |
| 4,086,485 A | 4/1978 | Kaplow et al. | |
| 4,225,781 A | * 9/1980 | Hammons | 250/203 R |
| 4,317,031 A | 2/1982 | Findell | |
| 4,320,288 A | 3/1982 | Schlarlack | |
| 4,332,238 A | * 6/1982 | Garcia, Jr. | 126/425 |
| 4,354,484 A | 10/1982 | Malone et al. | |
| 4,419,981 A | 12/1983 | Mori | |
| 4,445,030 A | 4/1984 | Carlton | |
| 4,469,938 A | 9/1984 | Cohen | |
| 4,484,565 A | * 11/1984 | Mori | 126/425 |
| 4,519,382 A | 5/1985 | Gerwin | |
| 4,583,520 A | 4/1986 | Dietrich et al. | |
| 4,589,400 A | * 5/1986 | Mori | 126/440 |
| 4,672,191 A | 6/1987 | Cofield | |
| 4,707,990 A | 11/1987 | Meijer | |
| 4,752,780 A | 6/1988 | Pipkin | |
| 4,794,909 A | 1/1989 | Eiden | |
| 4,930,493 A | * 6/1990 | Sallis | 126/438 |
| 5,404,723 A | 4/1995 | Parker et al. | |
| 5,722,239 A | 3/1998 | Houtman | |
| 6,005,236 A | * 12/1999 | Phelan et al. | 250/203.4 |

* cited by examiner

Primary Examiner—Hoang Nguyen
(74) Attorney, Agent, or Firm—Harness Dickey & Pierce P.L.C.

(57) ABSTRACT

A solar power system having a solar concentrator for concentrating solar energy, a receiver for converting the solar energy into another form of energy, and a control system for controlling the flux input to the solar receiver. The control system includes a plurality of sensors and a controller. The solar receiver is divided into a plurality of discrete sectors, with at least one of the sensors being coupled to each sector and producing a sensor signal that is related to the magnitude of the flux input to that sector. The controller is coupled to the sensor monitors each of the sensor signals, calculates a differential.

19 Claims, 5 Drawing Sheets

SOLAR RECEIVER ADAPTIVE TRACKING CONTROL

FIELD OF THE INVENTION

The present invention generally relates to solar powered electric generating systems and more particularly to a device and method for controlling a flux input to a solar receiver.

BACKGROUND OF THE INVENTION

Solar dishes that are formed from a plurality of reflective solar panels are commonly employed for concentrating solar energy and directing this energy to a power conversion unit that converts the solar energy into mechanical and/or electrical energy. A typical power conversion unit has a solar receiver which is positioned relative to the solar dish so as to receive the concentrated solar energy reflected by the solar panels. During the operation of the power conversion unit, it is highly desirable that an even flux be maintained on the receiver so as to increase its service life and ensure efficient operation. Variances in the flux transmitted to the receiver are relatively common and generally result from tracking variation and reflective surface variation. Tracking variation is associated with the positioning of the solar dish and generally results from the control interval that is employed to periodically reposition the solar dish, axis tilts, winds, gravity bending, mirror soiling and track errors. Reflective surface variation is associated with the concentrated light that is reflected by the solar panels and generally results from surface waviness, variation in the radius of curvature and the alignment of the facets (solar panels).

The application of an uneven flux to a power conversion unit results in higher temperature differentials on the receiver and an uneven power distribution among the sectors of the receiver. Uneven power distribution tends to reduce the efficiency and service life of the power conversion unit. Higher temperature differentials tend to increase the thermal stress on the receiver, thereby reducing its operating life as well as the efficiency with which it operates. Since the receiver is an expensive component, the decreased life undesirably increases the operating costs of the power conversion unit. Accordingly, a system and method for reducing flux variation is therefore desired.

SUMMARY OF THE INVENTION

In one preferred form, the present invention provides a solar power system including a mirror that is configured to receive and concentrate solar energy, a mirror positioning mechanism, a receiver, a plurality of sensors and a controller. The mirror positioning mechanism is coupled to the mirror and is configured to adjust a position of the mirror. The receiver is coupled to the mirror and is configured to receive the concentrated solar energy from the mirror. The receiver is divided into a plurality of sectors, with each of the sectors receiving a portion of the concentrated solar energy. Each of the sensors is coupled to an associated one of the sectors and is operable for generating a sensor signal indicative of an amount of energy transmitted into the associated one of the sectors. The controller is coupled to the mirror positioning mechanism and the sensors. In response to the receipt of the sensor signals, the controller determines a differential indicative of a difference in a flow of energy into the sectors and controls the mirror positioning mechanism in response to the differential to affect the concentrated solar energy that is transmitted into the receiver and maintain the differential below a predetermined differential limit.

In another preferred form, the present invention provides a method for positioning a solar concentrator. The method includes the steps of providing a receiver having a plurality of sectors, each of the sectors being operable for converting concentrated light energy into a second form of energy; positioning the solar concentrator to reflect concentrated light energy onto the sectors; monitoring a flow of energy transmitted into each of the sectors; calculating a differential indicative of a difference in the energy flows into the sectors; and repositioning the solar concentrator to maintain the differential below a predetermined differential limit.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

Additional advantages and features of the present invention will become apparent from the subsequent description and the appended claims, taken in conjunction with the accompanying drawings, wherein:

DETAILED DESCRIPTION OF THE PREFERRED EMBODIMENTS

Figure 1:
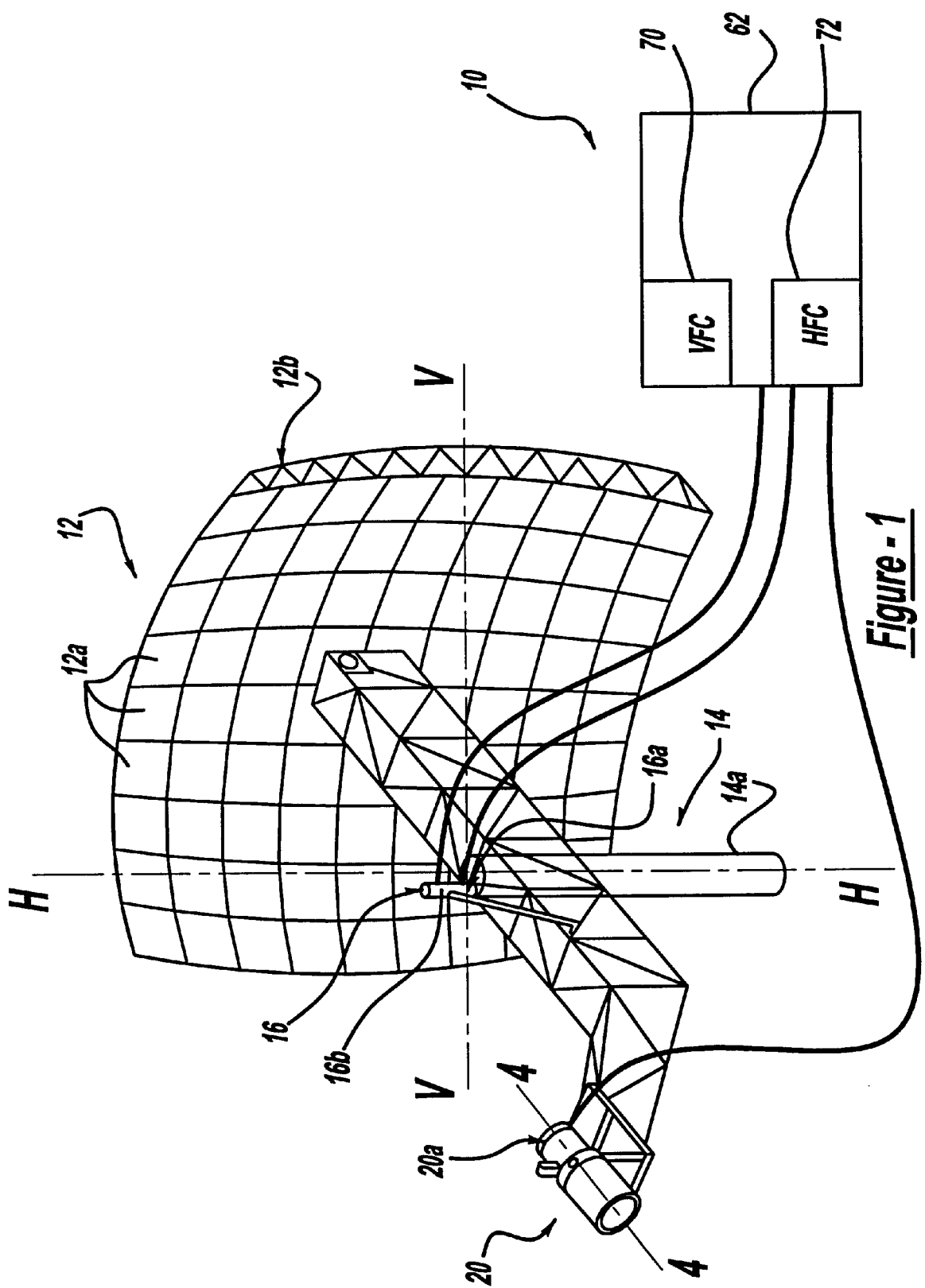
FIG. 1 is a schematic illustration of a solar power system having a control system constructed in accordance with the teachings of the present invention.

With reference to FIG. 1 of the drawings, a solar power system 8 having a control system 10 that is constructed in accordance with the teachings of the present invention. The solar power system 8 also includes a solar concentrator 12, a support structure 14, a concentrator positioning mechanism 16 and a power conversion unit 20 having a receiver 20a, all of which are conventional in their construction and operation and need not be discussed in detail herein. In the particular embodiment shown, the solar concentrator 12 is illustrated to be a glass-faceted concentrator having a parabolic shape which is defined by a plurality of mirror facets 12a that are fixedly coupled to a space frame 12b. The support structure 14 includes an elevating post 14a to which the solar concentrator 12 is movably coupled. The concentrator positioning mechanism 16 conventionally includes a first drive mechanism 16a for rotating the solar concentrator 12 about the longitudinal axis H—H of the elevating post 14a and a second drive mechanism 16b for rotating the solar concentrator 12 around the elevating post 14a about a lateral axis V—V.

Figure 2:
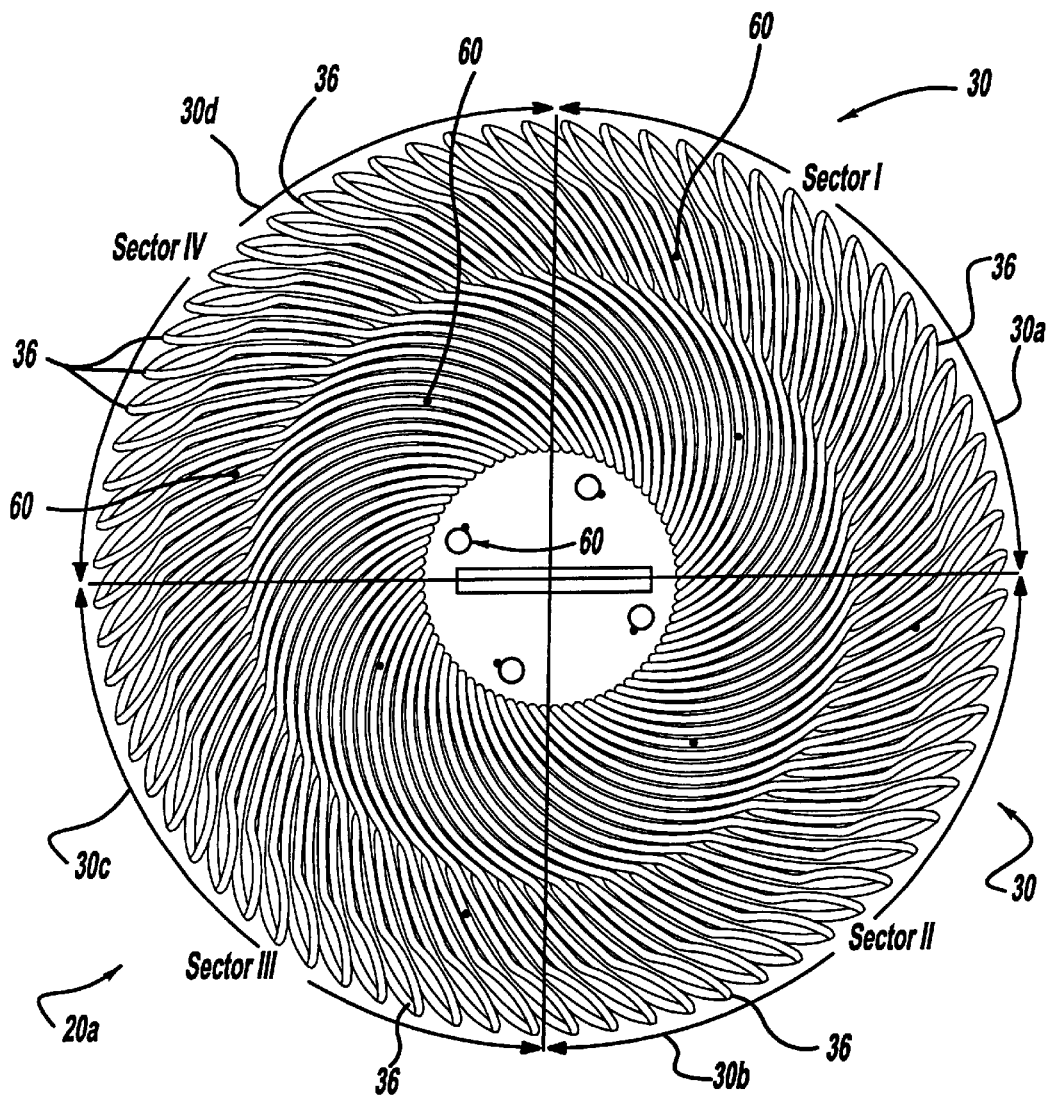
FIG. 2 is a front view of a portion of the solar power system of FIG. 1 illustrating the receiver in greater detail.

With additional reference to FIG. 2, the receiver 20a, is divided into a plurality of sectors 30, each of which being configured to convert the concentrated light energy that is reflected by the solar concentrator 12 into a second form of energy. In the particular embodiment illustrated, the receiver 20a is a directly illuminated solar receiver having a plurality of tubes 36 that are filled with a working fluid, such as hydrogen or helium. The tubes 36 convert the concentrated light energy into heat energy which is then transmitted to the working fluid.

Figure 3:
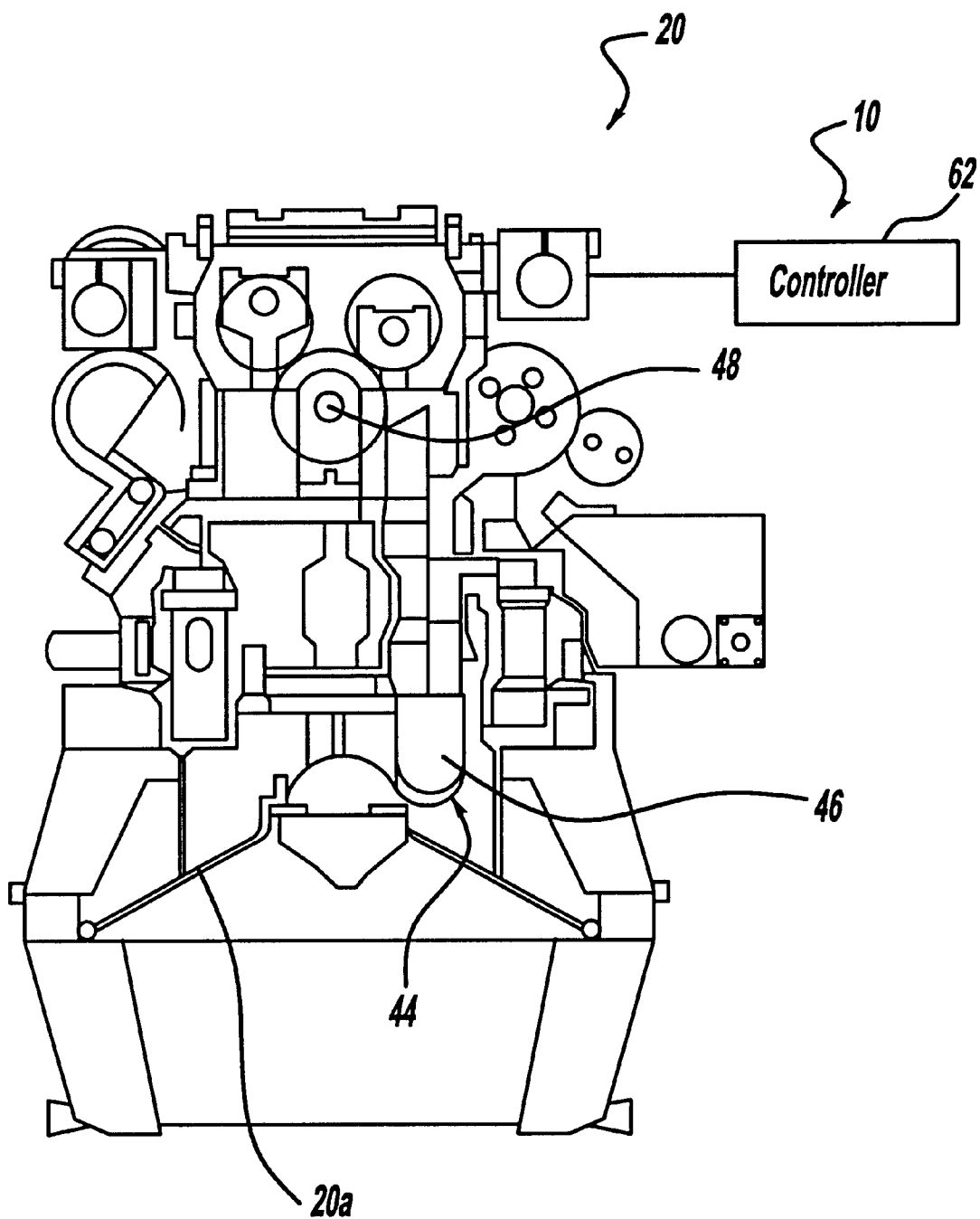
FIG. 3 is a schematic view of a portion of the solar power system of FIG. 1 illustrating the power conversion unit in greater detail.

In the example provided, the power conversion unit 20 includes a kinematics Stirling-cycle engine 40, such as a commercially available 4–95 MKII Stirling engine produced by United Stirling. With additional reference to FIGS. 3 and 4, the Stirling-cycle engine 40 conventionally includes a plurality of cylinders 44, with a corresponding number of pistons 46 that are mechanically linked via a crankshaft 48 to a rotating power output shaft (not specifically shown). The Stirling-cycle engine 40 is fixedly coupled to the receiver 20a, such that each of the tubes 36 in one of the sectors 30 is coupled to one of the cylinders 44. The Stirling-cycle engine 40 is also fixedly coupled to the space frame 12b to thereby fix the position of the receiver 20a , relative to the mirrors of the solar concentrator 12.

Figure 4:
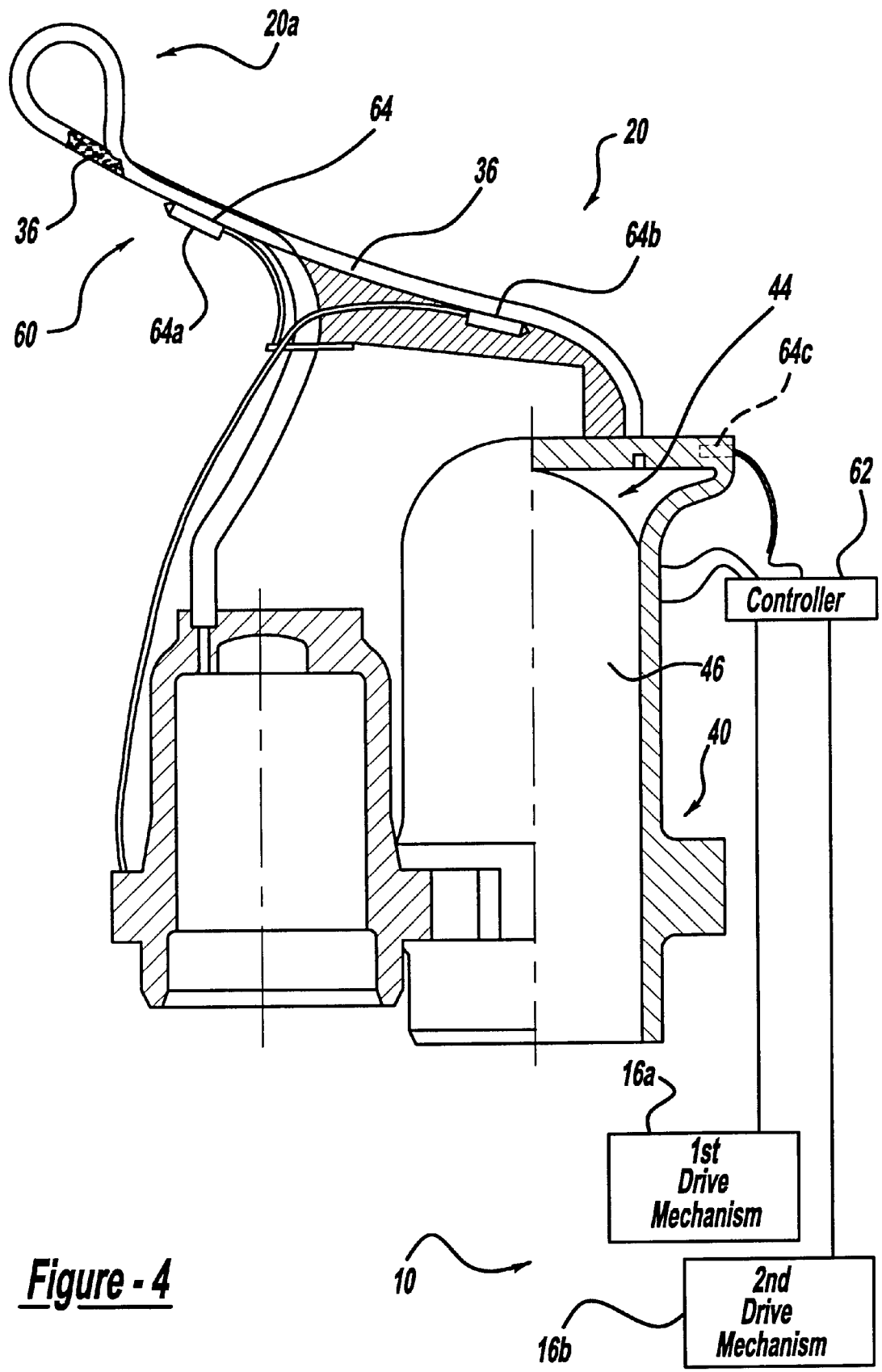
FIG. 4 is a sectional view taken along the line 4—4 of FIG. 3.

In FIGS. 2 and 4, the control system 10 is shown to include a plurality of sensors 60 and a controller 62. The sensors 60 are coupled to the receiver 20a and operable for generating sensor signals indicative of an amount of energy transmitted into an associated one of the sectors 30. In the particular example provided, the receiver 20a is operable for converting concentrated light energy into heat and as such, the sensors 60 are temperature sensors 64 that produce a sensor signal indicative of the temperature of the working fluid 36a disposed within the tube 36. With specific reference to FIG. 4, the control system 10 preferably includes a plurality of temperature sensors 64 that are coupled to each of the sectors 30 so as to more precisely monitor temperature changes in the working fluid that are indicative of changes to the flux in the sector 30. In the example illustrated, a first one of the temperature sensors 64a is coupled to the tube 36 in location that is distal to the Stirling-cycle engine 40, a second one of the temperature sensors 64b is coupled to the tube 36 in a location that is proximal to the Stirling-cycle engine 40 and a third one of the temperature sensors 64c is coupled to the tube 36 at the junction between the tube 36 and the Stirling-cycle engine 40. It should be apparent to those skilled in the art that the temperature sensors 64 are mounted such that they are not directly exposed to incident solar energy.

The controller 62 is coupled to the sensors 60 and the first and second drive mechanisms 16a and 16b and is operable for controlling the first and second drive mechanisms 16a and 16b to selectively position the solar concentrator 12 in accordance with the methodology of the present invention which is discussed in greater detail below. Briefly, the controller 62 controls the first and second drive mechanisms 16a and 16b so as to both track the position of the sun (in an attempt to control the total output of the solar concentrator 12) as well as to maintain a substantially equal flux transmitted to each of the sectors 30. In this regard, the controller 62 employs a nominal horizontal bias and a nominal vertical bias to control the first and second drive mechanisms 16a and 16b, respectively, so as to position the solar concentrator 12 at a nominal targeting position.

As those skilled in the art will readily appreciate, solar energy received by the tube 36 of each sector 30 is employed to heat the working fluid that is contained therein. In the embodiment provided, the working fluid is heated to a temperature of approximately 650° C. to 750° C. and has a pressure of approximately 150 bar. When in this high pressure, high temperature state, the working pressure is circulated to one of the pistons 46 in a manner that is well known in the art to thereby convert the solar energy into mechanical energy that is ultimately employed by a generator (not shown) to generate electrical energy. As each piston 46 is supplied with working fluid from a discrete supply (i.e., from only one of the tubes 36) rather than from a common manifold, it is desirable that the temperature of the working fluid that is output from each of the tubes 36 be uniform so that the working fluid in each of the cylinders will undergo pressure and volume changes that are substantially similar in magnitude to thereby operate the power conversion unit 20 with improved efficiency. As the temperature of the working fluid that is output from a tube 36 is. related to the flux input to the associated sector 30, an even flux on each of the sectors 30 is desired.

As noted above, the control system 10 is employed to adjust the position of the flux input to each of the sectors 30. In this regard, the flux input to each sector 30 is indirectly monitored via the sensors 60. In the example provided, sensor signals produced by the sensors 60 permit the controller 62 evaluate the flux input to the sectors 30. Assuming the flux input to each of the sectors 30 to be equal, the temperature of the working fluid in each of the sectors 30 would also be equal. Accordingly, a temperature difference in the working fluid of any of the sectors is indicative of an uneven flux. In the embodiment provided, the temperature of the working fluid in a sector 30 is monitored at three points (see, FIGS. 2 and 4) and the average value of these points is calculated to determine the temperature of the working fluid. Those skilled in the art will understand, however, that other methods may be utilized to calculate the temperature of the working fluid, including the use of a weighted average.

In response to the detection of an uneven flux, the controller 62 is employed to control the first and second drive mechanisms 16a and 16b to adjust the position of the solar concentrator 12 so as to alter the flux and reduce the temperature differential. Preferably, temperatures differentials are calculated in relation to the manner in which each of the first and second drive mechanisms 16a and 16b are configured to position the solar concentrator 12. For example, as the second drive mechanism 16b is operable for rotating the solar concentrator 12 about the axis H—H, it is preferred that the differential(s) that are employed to calculate the magnitude by which the second drive mechanism 16b repositions the solar concentrator 12 be taken in a direction that crosses axis H—H. In the example provided, the differential that is employed to determine the amount by which the second drive mechanism 16b is controlled to reposition the solar concentrator 12 about the axis H—H, also known as vertical error signal, is calculated by subtracting the temperature differential of sector 30d from the temperature differential of sector 30b. Those skilled in the art will understand, however, that the vertical error signal may be calculated by several alternative methods, including for example: subtracting the temperature differential of sector 30a from the temperature differential of sector 30b; subtracting the temperature differential of sector 30d from the temperature differential of sector 30c; or averaging the difference of the temperature differential of sector 30b and the temperature differential of sector 30a with the difference of the temperature differential of sector 30c and the temperature differential of sector 30d {i.e., [(SECTOR 2–SECTOR 1)+(SECTOR 3–SECTOR 4)]/ 2}. Similarly, it is preferred that the differential(s) that are employed to calculate the magnitude by which the first drive mechanism 16a repositions the solar concentrator 12 be taken in a direction that crosses its axis V—V. In the example provided, the differential that is employed to determine the amount by which the first drive mechanism 16a is controlled to reposition the solar concentrator 12 about the axis V—V, also known as the horizontal error signal, is calculated by subtracting the temperature differential of sector 30c from the temperature differential of sector 30a. Those skilled in the art will understand, however, that the horizontal error signal may be calculated by several alternative methods, including for example: subtracting the temperature differential of sector 30a from the temperature differential of sector 30d; subtracting the temperature differential of sector 30b from the temperature differential of sector 30c; or averaging the difference of the temperature differential of sector 30d and the temperature differential of sector 30a with the difference of the temperature differential of sector 30c and the temperature differential of sector 30b {i.e., [(SECTOR 4−SECTOR 1)+(SECTOR 3−SECTOR 2]1/2}.

Figure 5:
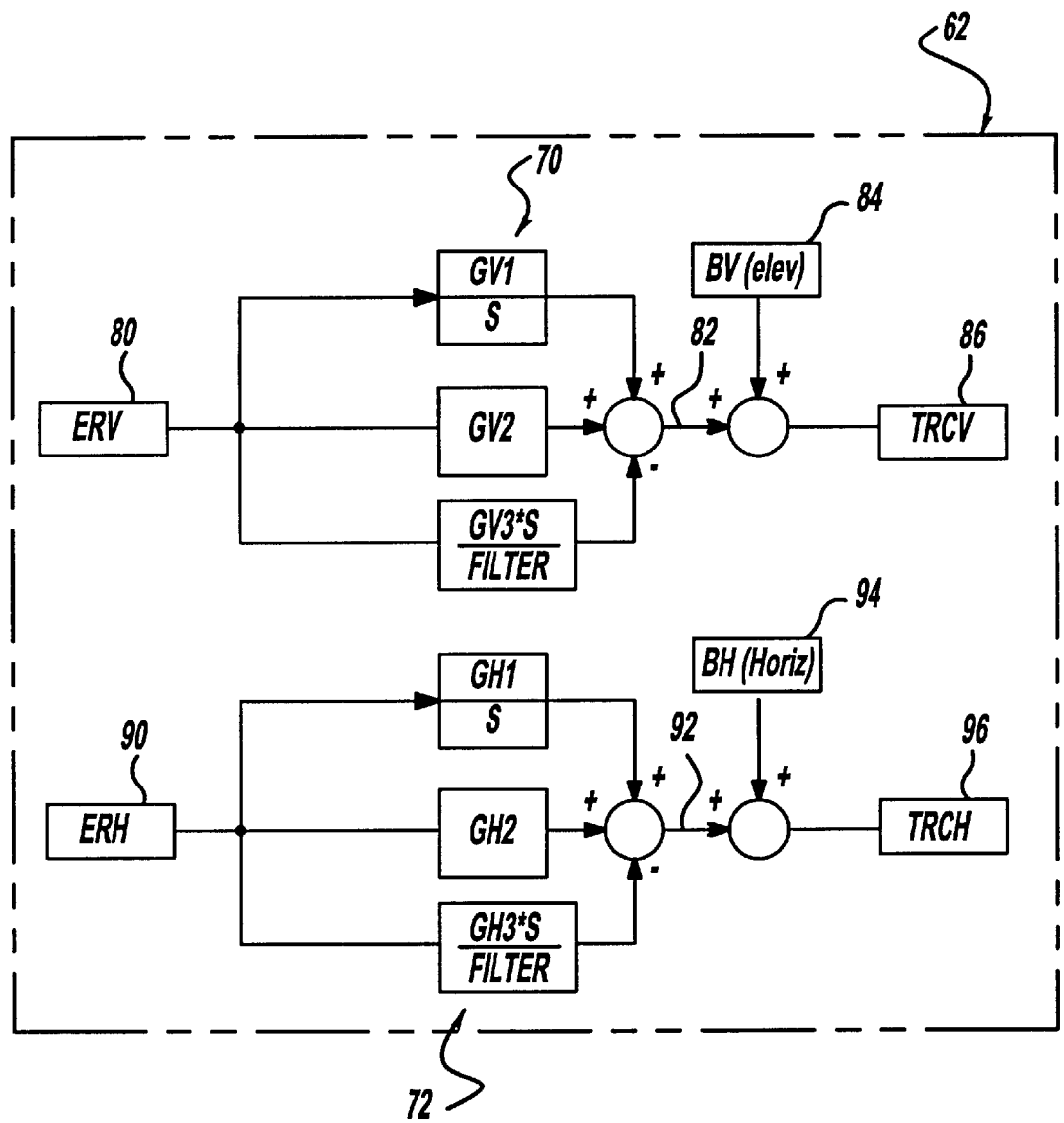
FIG. 5 is a schematic illustration of a portion of the controller.

With reference to FIGS. 1 and 5, the controller 62 is illustrated to include a vertical feedback controller 70 and a horizontal feedback controller 72. In the particular embodiment illustrated, the vertical and horizontal feedback controllers 70 and 72 are PID (proportional-integral-derivative) feedback controllers of the type that is generally well known to those skilled in the art. Generally speaking, the vertical and horizontal feedback controllers 70 and 72 employ the vertical and horizontal tracking errors, respectively, to generate outputs that are applied to the nominal vertical bias and the nominal horizontal bias, respectively, so as to reposition the solar concentrator 12 to minimize, or preferably eliminate, differences in the receiver temperature of the working fluid in the sectors 30.

For example, the vertical error signal, which is designated by block 80, is input to the vertical feedback controller 70 where several mathematical operations are employed to generate an output 82 that is added to the nominal vertical bias, which is designated by block 84. The resultant value, indicated at block 86, is employed by the controller 62 to control the second drive mechanism 16b to reposition the solar concentrator 12 about the axis H—H. Similarly, the horizontal error signal, which is designated by block 90, is input to the horizontal feedback controller 72 where several mathematical operations are employed to generate an output 92 that is added to the nominal horizontal bias, which is designated by block 94. The resultant value, indicated at block 96, is employed by the controller 62 to control the first drive mechanism 16a to reposition the solar concentrator 12 about the axis V—V. As those skilled in the art will readily understand, each of the gains or tuning constants that employed by the vertical and horizontal feedback controllers 70 and 72 are selected to meet system control stability requirements and minimize "overshoot" and "undershoot".

Although the control system 10 has been discussed as being responsive to any temperature differential between the working fluids of two predetermined sectors 30, those skilled in the art will understand that the control system 10 may be configured somewhat differently. In this regard, the control system 10 may be configured to ignore temperature differentials that are less than a predetermined temperature differential limit.

While the invention has been described in the specification and illustrated in the drawings with reference to a preferred embodiment, it will be understood by those skilled in the art that various changes may be made and equivalents may be substituted for elements thereof without departing from the scope of the invention as defined in the claims. In addition, many modifications may be made to adapt a particular situation or material to the teachings of the invention without departing from the essential scope thereof. Therefore, it is intended that the invention not be limited to the particular embodiment illustrated by the drawings and described in the specification as the best mode presently contemplated for carrying out this invention, but that the invention will include any embodiments falling within the foregoing description and the appended claims.

What is claimed is:

1. A solar power system comprising:
   a mirror configured to receive and concentrate solar energy;
   a mirror positioning mechanism coupled to the mirror and configured to adjust a position of the mirror;
   a receiver coupled to the mirror and configured to receive the concentrated solar energy from the mirror, the receiver being divided into a plurality of sectors, each of the sectors receiving a portion of the concentrated solar energy;
   a plurality of sensors, each of the sensors being individually coupled to an associated one of the sectors and operable for generating a sensor signal indicative of an amount of energy transmitted into the associated one of the sectors; and
   a controller coupled to the mirror positioning mechanism and the sensors, the controller receiving the sensor signals and determining a differential indicative of a difference in a flow of energy into the sectors, the controller controlling the mirror positioning mechanism in response to the differential to affect the concentrated solar energy that is transmitted into the receiver and maintain the differential below a predetermined differential limit.

2. The solar power system of claim 1, wherein each of the sectors includes at least one tube that is filled with a fluid.

3. The solar power system of claim 2, wherein the fluid is a gas.

4. The solar power system of claim 2, wherein the sensors are temperature sensors for monitoring a temperature of the fluid.

5. The solar power system of claim 4, wherein a plurality of temperature sensors are spaced apart along a length of the tube, the controller receiving the sensor signals generated by the temperature sensors and employing a predetermined algorithm to calculate a temperature of the fluid in the tube.

6. The solar power system of claim 4, wherein the temperature is an average temperature of the fluid in the tube.

7. The solar power system of claim 1, further comprising a power conversion unit coupled to the receiver and receiving heat energy from each of the sectors.

8. The solar power system of claim 7, wherein the power conversion unit is a Stirling-cycle engine having a plurality of engine cylinders.

9. The solar power system of claim 8, wherein the quantity of sectors in the receiver is equal to the quantity of engine cylinders in the Stirling-cycle engine.

10. The solar power system of claim 1, wherein the controller determines a nominal mirror targeting point that maximizes a flux output of the mirror, a first tracking offset and a second tracking offset, the first and second tracking offsets being employed to offset the position of the mirror from the nominal mirror targeting point to affect the flow of energy into the sectors.

11. A method for positioning a solar concentrator, the method comprising the steps of:
    providing a receiver having a plurality, of sectors, each of the sectors being operable for converting concentrated light energy into a second form of energy;
    positioning the solar concentrator to reflect concentrated light energy onto the sectors;
    monitoring a flow of energy transmitted into each of the sectors;
    calculating a differential indicative of a difference in the energy flows into the sectors; and repositioning the solar concentrator to maintain the differential below a predetermined differential limit.

12. The method of claim 11, wherein the second form of energy is heat.

13. The method of claim 12, wherein the step of monitoring the flow of energy transmitted into each of the sectors includes the steps of:

mounting at least one temperature sensor to each of the sectors, each temperature sensor operable for generating a sensor signal indicative of a temperature of a working fluid in an associated one of the sectors; and monitoring the temperature of the working fluid in each of the sectors.

14. The method of claim 11, wherein the step of positioning the solar concentrator to reflect concentrated light energy onto the sectors includes the steps of:

determining a nominal targeting point; and positioning the solar concentrator at the nominal targeting point to maximize a flux output by the solar concentrator.

15. The method of claim 14, wherein the step of repositioning the solar concentrator includes the steps of:

calculating a first tracking offset indicative of a distance along a first axis by which the solar concentrator is to be offset from the nominal targeting point; and calculating a second tracking offset indicative of a distance along a second axis by which the solar concentrator is to be offset from the nominal targeting point, the second axis being normal to the first axis.

16. A method for directing energy input to a solar receiver, the solar receiver having a plurality of sectors, each of the sectors being operable for converting concentrated light energy into a second form of energy, the method comprising the steps of:

monitoring a flow of energy transmitted into each of the sectors;

calculating a differential indicative of a difference in the energy flows into the sectors; and repositioning the solar receiver to maintain the differential below a predetermined differential limit.

17. The method of claim 16, wherein the solar receiver is fixedly coupled to a solar concentrator and the step of repositioning the solar receiver is accomplished by repositioning the solar receiver.

18. The method of claim 16, wherein the second form of energy is heat.

19. The method of claim 18, wherein the step of monitoring the flow of energy transmitted into each of the sectors includes the steps of:

mounting at least one temperature sensor to each of the sectors, each temperature sensor operable for generating a sensor signal indicative of a temperature of a working fluid in an associated one of the sectors; and monitoring the temperature of the working fluid in each of the sectors.

* * * * *